US008420802B2

(12) United States Patent
Jardine et al.

(10) Patent No.: US 8,420,802 B2
(45) Date of Patent: Apr. 16, 2013

(54) POLYMER SUPPORT

(75) Inventors: Moegamat Anwar Jardine, Rondebosch (ZA); Gregory Stuart Smith, Thornton (ZA); Banothile Charity Events Makhubela, Goodwood (ZA)

(73) Assignee: University of Cape Town, Cape Town (ZA)

( * ) Notice: Subject to any disclaimer, the term of this patent is extended or adjusted under 35 U.S.C. 154(b) by 0 days.

(21) Appl. No.: 13/496,116

(22) PCT Filed: Sep. 14, 2010

(86) PCT No.: PCT/IB2010/002291
§ 371 (c)(1),
(2), (4) Date: Mar. 14, 2012

(87) PCT Pub. No.: WO2011/083360
PCT Pub. Date: Jul. 14, 2011

(65) Prior Publication Data
US 2012/0178916 A1    Jul. 12, 2012

(30) Foreign Application Priority Data

Sep. 14, 2009 (ZA) .................................. 2009/06358

(51) Int. Cl.
*C08B 37/08* (2006.01)
(52) U.S. Cl.
USPC ............................................ 536/55.1; 536/20
(58) Field of Classification Search .................. None
See application file for complete search history.

(56) References Cited

U.S. PATENT DOCUMENTS

| 4,274,980 A | | 6/1981 | Arena |
| 4,367,355 A | | 1/1983 | Arena |
| 4,431,836 A | | 2/1984 | Arena |
| 5,114,606 A | * | 5/1992 | van Vliet et al. .................. 8/111 |

FOREIGN PATENT DOCUMENTS

| JP | 06227813 | 8/1994 |
| JP | 2005200531 | 7/2005 |
| JP | 2007006849 | 1/2007 |

OTHER PUBLICATIONS

English translation of Japanese patent application 2007-006849, published Jan. 18, 2007.*
Bachran et al., "Interaction of Iron(II) with Lactose" Journal of Agricultural and Food Chemistry (1980) vol. 28 pp. 536-540.*
Swartz et al., "Interactions of Metal Ions with Lactose" Journal of Food Science (1978) vol. 43 pp. 93-97.*
Satoh et al., "6-Amino-6-deoxychitosan. Preparation and Application as Plasmid Vector in COS-1 Cells" Chemistry Letters (2004) vol. 33 No. 3 pp. 340-341.*
Satoh et al., "6-Amino-6-deoxy-chitosan. Sequential chemical modifications at the C-6 positions of N-phthaloyl-chitosan and evaluation as a gene carrier", Carbohydrate Research, 2006, vol. 341, pp. 2406-2413.
Matthew Fisher, International Search Report in PCT/IB2010/002291, Nov. 25, 2010, 6 pages, Australian Patent Office, Woden, Australia.
Matthew Fisher, Written Opinion of the International Searching Authority in PCT/IB2010/002291, Nov. 25, 2010, 6 pages, Australian Patent Office, Woden, Australia.
Cecile Chatel, International Preliminary Report on Patentability in PCT/IB2010/002291, Mar. 20, 2012, 7 pages, The International Bureau of WIPO, Geneva, Switzerland.

* cited by examiner

*Primary Examiner* — Eric S Olson
(74) *Attorney, Agent, or Firm* — Florek & Endres PLLC

(57) ABSTRACT

The invention provides a polymer support characterized in that the polymer is 6-amino 6-deoxy chitosan. Metal-immobilized 6-amino 6-deoxy chitosan is further provided, more particularly including one of Pd, Pt, Ru, Rh Ir, Os, Mn, Ni, Co and Fe in all their possible oxidation states complexed to 6-amino 6-deoxy chitosan through a Schiff-base ligand.

13 Claims, No Drawings

POLYMER SUPPORT

This application is a U.S. National Stage filing under 35 U.S.C. §371 of International Application No. PCT/IB2010/002291, filed Sep. 14, 2010, which in turn claims priority to South African Patent Application No. 2009/06358, filed Sep. 14, 2009.

FIELD OF THE INVENTION

This invention relates to a novel polymer support and to a process for the preparation thereof.

BACKGROUND TO THE INVENTION

A polymer support is a polymer onto which a functional molecule, such as a reagent or catalyst, is chemically bound, immobilized, dispersed, or associated. A polymer support is usually a network polymer, typically prepared in bead form by suspension polymerization or isolated from a natural source. The location of active sites introduced into a polymer support depends on the type of polymer support. In a swollen-gel-bead polymer support the active sites are distributed uniformly throughout the beads, whereas in a macroporous-bead polymer support they are predominantly on the internal surfaces of the macropores. Natural polymers could potentially have either attribute.

In order to separate the active reagent or catalyst away from the polymer, often referred to as the polymer backbone, a linker may be introduced. The linker may be in the form of a ligand and is typically introduced as a bifunctional moiety or molecule which is reactive to the polymer on one side and reactive to the supported functional molecule, such as a reagent, catalyst or protein, on the other side. The linker could also, for example, be a chelate where it is superceded by a non-covalent/ionic interaction with a metal. A linker thus minimises the potential for non-selective interaction between the polymer backbone and the reactants in the solution in which it is suspended.

In this specification "linker" shall have its widest meaning and shall include a molecule or compound which acts to couple or bond a functional molecule to a polymer.

As will be apparent, one use for polymer supports is in the manufacture of catalysts where catalytic material is supported on a polymer.

Palladium-catalysed cross coupling reactions of organohalides with olefins and organo-boronic acids for carbon-carbon bond formation are extremely useful to the chemical industry and in research. Since their discovery they have evolved into a general technique in preparing biologically active functionalised biphenyls which are important intermediates or products in drug discovery, pharmaceuticals and agricultural compounds.

Historically, palladium complexes such as [Pd(OAc)$_2$] and [Pd(PPh$_3$)Cl$_2$] have been widely used as homogenous catalyst systems in cross coupling reactions. However, these homogenous catalytic systems suffer from problems associated with the separation and recovery of the active catalyst as well as instability at high temperatures. These drawbacks have so far limited the industrial exploitation. From the perspective of process development, homogenous catalysts require expensive phosphine ligands (to generate the active catalyst) which are often not available in bulk. Metal contamination of the products is inevitable when using homogenous catalysts. This is an undesirable result, especially in the pharmaceutical industry. There is therefore a need to develop improved and practical strategies for recycling active catalysts for economic and environmental stewardship reasons.

Most of the problems related to homogenous catalysts can be solved by immobilising the catalyst or catalyst precursor on polymer supports with good solvation attributes. Supporting transition metal catalysts on insoluble or soluble polymer supports can, for example, improve the stability without compromise in the activity and selectivity of the catalyst. Supported catalysts also allow simplified recovery and reuse of the catalyst as well as physical separation of the active site, thus minimising catalyst self-destruction.

Due to the inherent advantages of heterogenising homogenous catalysts through immobilisation on solid supports, a great deal of effort has been devoted to these developments. However, the majority of these reported catalysts based on synthetic organic polymer supports, such as polystyrene, poly (ethylene) glycol and the like, and inorganic supports, such as silica, alumina and other metal oxides, including commercial supported catalyst such as [(PPh$_3$)$_4$Pd]-cross-linked polystyrene-bound and Pd$^0$ on alumina. Recent efforts in the development of environmentally friendly, sustainable chemistry have led to the use of biopolymers as catalyst supports. Biopolymers are readily available in nature and can be used as suitable supports for many reagents and catalysts, thus offering the advantages of being renewable, biodegradable and non-toxic. Biopolymers such as cellulose, gelatine and starch have been investigated as catalyst supports. In recent years, the alternative polymer chemistry and functionalisation potential of chitosan have also been investigated.

Chitin is the second most abundant natural biopolymer in the world, behind only cellulose. It is a heterogeneous polysaccharide that consists of beta-1,4-linked N-acetylglucosamine residues that are arranged in antiparallel (alpha), parallel (beta), or mixed (gamma) strands, with the alpha configuration being the most abundant. It is also the most abundant naturally occurring polysaccharide that contains amino sugars. This abundance, combined with the specific chemistry of its derivative, chitosan, provides for an array of potential applications. Chitin and chitosan have already found applications in diverse products that have reached the market. The material is widely available globally and comes in a variety of grades and from numerous sources.

Chitosan is produced by deacetylation of the abundant biopolymer chitin, a key constituent of the exoskeletons of crustaceans and the cell walls of algae. It has been shown to exhibit interesting biopesticidal, antifungal and anti-cancer properties and has been used successfully in food and water treatment.

Chitosan can be readily transformed into films or fibres and has found applications as adsorbents for metals, in medicine and in drug delivery. Its chirality, variable degree of solubility in many organic solvents after modification and capability of being cast into films and fibres from dilute acid makes chitosan an excellent candidate as a support for catalysts. Several catalytic systems using chitosan as a support are in fact known. Functionalisation of chitosan to provide coordination sites has been carried out and this has provided catalysts for oxidation, cyclopropanation of olefins, Suzuki and Heck cross coupling reactions.

Due to the poor aqueous solubility of natural chitin and more so, chitosan, it is desirable to find a water soluble derivative of chitosan. Numerous strategies have been proposed for conjugating polar groups to the 6-hydroxy and or the 2-amino functional groups of chitosan. Satoh et al (T. Satoh, H. Kano, M. Nakatani, N. Sakairi, S. Shinkai and T. Nagasaki, *Carbohydr. Res.*, 2006, 341, 2406-2413) first reported the preparation of modified chitosan (6-deoxy 6-amino chitosan), which was used as a gene carrier. The reported procedure involved the synthesis of a 2-amino protected chitosan in the form of N-phthaloyl-chitosan. Having protected the amino group, the 6-hydroxy group of chitosan could selectively be converted to the 6-chloro, 6-bromo or 6-iodomethylene polymer. Substitution of the halogen with an azido group, followed by reduction thereof, gave the 6-deoxy 6-amino chitosan.

It is, however, impractical to scale up the polymer synthesis using the above prior art route since it requires relatively large reagent mass transfers and results in poor product quality. Other than in its above role in gene transfer, no further applications for 6-amino 6-deoxy chitosan have been proposed.

OBJECT OF THE INVENTION

It is an object of this invention to provide a new polymer support as well as a process for the preparation thereof.

SUMMARY OF THE INVENTION

According to this invention there is provided a polymer support characterised in that the polymer is 6-amino 6-deoxy chitosan.

Further features of the invention provide for a linker to be provided on at least some, preferably the majority, of the amine groups of the polymer; for the linker to be introduced as a heterobifunctional moiety; for the heterobifunctional moiety to be capable of covalent coupling with the amino groups of the polymer backbone on the one end and functional molecules or proteins on the other end; and for the heterobifunctional moiety to include succinimidyl acetylthioacetate, succinimidyl trans-4-(maleimidylmethyl)cyclohexane-1-carboxylate, succinimidyl 3-(2-pyridyldithio)propionate, 1-ethyl-3-(3-dimethylaminopropyl)carbodiimide, N-((2-pyridyldithio)ethyl)-4-azidosalicylamide, 4-azido-2,3,5,6-tetrafluorobenzoic acid, succinimidyl ester, benzophenone-4-maleimide, benzophenone-4-isothiocyanate, 4-benzoylbenzoic acid, succinimidyl ester, iodoacetamide azide, iodoacetamide alkyne, azido (PEO)$_4$ propionic acid, succinimidyl ester, alkyne, succinimidyl ester, alpha-maleimidoacetic acid-NHS, 2-maleimidoethyl amine.TFA, 3-maleimidopropionic acid NHS, 3-maleimidopropionic acid-PFP ester, 4-maleimidobutyric acid NHS, 6-maleimidocaproic acid NHS, 6-[N-(6-maleimidocaproyl)]caproic acid NHS, 6-maleimidocaproic acid sulfo-NHS, 6-maleimidocaproic acid (2-nitro-4-sulfo) phenyl ester sodium salt, 11-maleimidoundecanoic acid sulfo-NHS, succinimidyl 6-[(3-maleimido)propionamido]-hexanoate, LC-SMPH, b-maleimidopropionic acid hydrazide, e-maleimidocaproic acid hydrazide, 11-maleimidoundecanoic acid hydrazide, 3-maleimidopropionic acid, 4-maleimidobutyric acid, 6-maleimidocaproic acid, 11-maleimidoundecanoic acid, SMCC, sulfo-SMCC, SMCC hydrazide, LC-SMCC, m-maleimidobenzoyl N-hydroxysuccinimide, sulfo-MBS-1, p-maleimidobenzoyl N-hydroxysuccinimide, succinimidyl-(4-vinylsulfonyl)benzoate, N-succinimidyl-(4-iodoacetyl)aminobenzoate, sulfo-SIAB, p-maleimidophenylisocyanate, N-succinimidyl S-acetylthioacetate, N-succinimidyl S-acetylthiopropionate, succinimidyl 3-bromoacetamido) propionate, succinimidyl iodoacetate, succinimidyl bromoacetate, succinimidyl 4-(p-maleimidophenyl)butyrate, succinimidyl-p-formyl-benzoate, pyridine dithioethylamine hydrochloride, 4-(N-maleimido)benzophenone, 4-(N-succinimidylcarboxy)benzophenone, 4-(N-iodoacetyl)benzophenone, (N-succinimidyl 3-[2-pyridyldithio]propionate), (3-[2-pyridyldithio]propionyl hydrazide), succinimidyl 6-[3-(2-pyridyldithio)propionamido]hexanoate, sulfo-succinimidyl 6-[3-(2-pyridyldithio)propionamido]hexanoate, succinimidyl-4-[2-(tert-butoxycarbonyl)hydrazino]benzoate, succinimidyl-4-[2-(tert-butoxycarbonyl)hydrazino]acetate, 2-iminothiolane hydrochloride, S-acetylmercaptosuccinic anhydride, 6-(N-trifluoroacetyl)caproic acid NHS, 6-(N-t-BOC)caproic acid NHS, succinimidyl-6-(iodoacetyl)aminocaproate, and methyl N-succinimidyl adipate.

Alternately there is provided for the linker to include a bifunctional molecule capable of moderate coupling to the polymer amino functional groups; for the bifunctional molecule to be capable of complexing a metal after being immobilised on the polymer; for the metal to include Pd, Pt, Ru, Rh, Ir, Os, Mn and Fe in all their possible oxidation states; for the bifunctional molecule to be an aldehyde, capable of Schiff base coupling; and for the aldehyde linker (ligand or chelate) to include

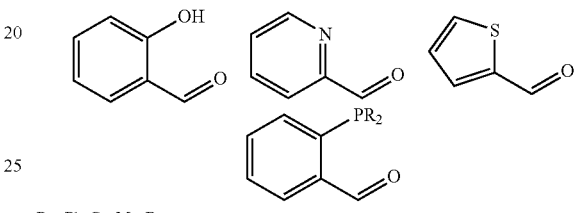

R = Ph, Cy, Me, Bu

The invention further provides for the use of 6-amino 6-deoxy chitosan as a polymer support.

The invention also provides a compound which includes 6-amino 6-deoxy chitosan and which is characterised in that the 6-amino 6-deoxy chitosan acts as a polymer support to a functional molecule associated therewith.

A further feature of the invention provides for the 6-amino 6-deoxy chitosan to act as a support to immobilise a functional metal; and for the immobilised metal to include Pd, Pt, Ru, Rh Ir, Os, Mn, Ni, Co and Fe in all their possible oxidation states.

Still further features of the invention provide for the metal to be complexed to the 6-amino 6-deoxy chitosan through a chelate; and for the chelate to include a Schiff base ligand.

The invention further provides a catalyst comprising metal-immobilised 6-amino 6-deoxy chitosan.

Further features of the invention provide for the immobilised metal to be selected from Pd, Pt, Ru, Rh Ir, Os, Mn, Ni, Co and Fe in all their possible oxidation states; for the metal to be complexed to the 6-amino 6-deoxy chitosan through a chelate; and for the chelate to include a Schiff base ligand.

The invention still further provides a process for the preparation of a metal-immobilised 6-amino 6-deoxy chitosan which includes preparing a 6-amino 6-deoxy chitosan Schiff base by exhaustive reaction of an aldehyde containing ligand, followed by reaction with a metal precursor in a suitable solvent and mixing until the reaction is complete.

Further features of the invention provide for the solvent to be a polar solvent, whether protic or aprotic, including water, methanol, ethanol, propanol, acetic acid, dimethylformamide, N-methylpyrrolidinone, dimethylsulfoxide and pyridine; and for the 6-amino 6-deoxy chitosan Schiff base ligand to be prepared by adding 6-amino 6-deoxy chitosan to a suitable aldehyde and appropriate solvent until the reaction is complete.

The invention still further provides a process for the preparation of 6-amino 6-deoxy chitosan which includes converting the 6-hydroxy group of N-phthaloyl-chitosan to obtain the 6-p-toluenesulfonate ester, substituting the 6-p-toluenesulfonate ester with azide to obtain the 6-azido polymer, and reducing the 6-azido polymer to yield 6-deoxy 6-amino chitosan.

EXAMPLES

A new polymer support is provided by the invention which is characterised in that the polymer is 6-amino 6-deoxy chitosan. 6-Deoxy 6-amino chitosan is formed from the monomer 6-deoxy 6-amino glucosamine and typically has a molecular mass range between 100-10000 kDa. Two types of relatively reactive moieties exist on the monomers, namely, the hydroxyl group and the amine group. The hydroxyl groups have slightly different reactivity but can be functionalized by etherification or esterification on either the acetylated or deacetylated monomers of the chitosan. The primary amine of the deacetylated monomer of chitosan reacts readily at moderate pH. These synthetic methodologies provide new chitosan compounds bearing different properties from the original chitosan polymer. 6-Deoxy 6-amino chitosan provides two moderately reactive amines for functionalisation. Furthermore, the inherent solubility of the 6-deoxy 6-amino chitosan facilitates reactivity in a wider range of solvents. Other water soluble polymers capable of forming similar structures include cellulose and PEG-PLA copolymers. However, conjugation occurs through hydroxyl groups, which require harsh synthetic methods and does not provide the option of orthogonal protection-deprotection strategies.

According to a preferred embodiment, the polymer support of 6-deoxy 6-amino chitosan according to the invention has the following form:

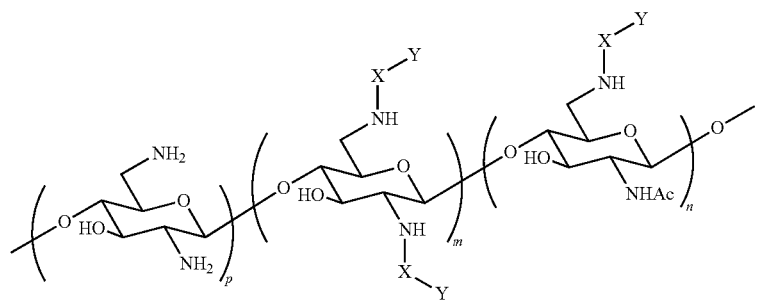

Preferably, p and n are small in comparison to m resulting in the polymer being highly substituted. X represents a linker which is originally bifunctional and is anchored to the amine groups of the polymer. The remaining terminal moiety of the linker is thus available for further coupling to functional molecules Y. The bifunctional linker is thus reactive toward the amino functional groups of the polymer backbone on one side and reactive toward an alternative functional group, belonging to functional molecules, on the opposite end. In this specification, "functional molecule" shall have its widest meaning and include reactive molecules, metal or proteins which it may be desired to support on the polymer and includes terminal molecules.

According to one embodiment of the invention, the linker could be a heterobifunctional moiety capable of covalent coupling to the polymer backbone on the one end and the functional molecules on the other end. Such heterobifunctional moieties include, but are not limited to, the following:
succinimidyl acetylthioacetate,
succinimidyl trans-4-(maleimidylmethyl)cyclohexane-1-carboxylate,
succinimidyl 3-(2-pyridyldithio)propionate,
ethyl-3-(3-dimethylaminopropyl)carbodiimide,
N-((2-pyridyldithio)ethyl)-4-azidosalicylamide,
4-azido-2,3,5,6-tetrafluorobenzoic acid,
succinimidyl ester,
benzophenone-4-maleimide,
benzophenone-4-isothiocyanate,
4-benzoylbenzoic acid,
succinimidyl ester,
iodoacetamide azide,
iodoacetamide alkyne,
azido (PEO)$_4$ propionic acid,
succinimidyl ester,
alkyne,
succinimidyl ester,
alpha-maleimidoacetic acid-NHS,
2-maleimidoethyl amine.TFA,
3-maleimidopropionic acid NHS,
3-maleimidopropionic acid-PFP ester,
4-maleimidobutyric acid NHS,
6-maleimidocaproic acid NHS,
6-[N-(6-maleimidocaproyl)]caproic acid NHS,
6-maleimidocaproic acid sulfo-NHS,
6-maleimidocaproic acid (2-nitro-4-sulfo) phenyl ester sodium salt,
11-maleimidoundecanoic acid sulfo-NHS,
succinimidyl 6-[(3-maleimido)propionamido]-hexanoate,
LC-SMPH,
b-maleimidopropionic acid hydrazide,
e-maleimidocaproic acid hydrazide,
11-maleimidoundecanoic acid hydrazide,
3-maleimidopropionic acid,
4-maleimidobutyric acid,
6-maleimidocaproic acid,
11-maleimidoundecanoic acid,
SMCC,
sulfo-SMCC,
SMCC hydrazide,
LC-SMCC,
m-maleimidobenzoyl N-hydroxysuccinimide,
sulfo-MBS-1,
p-maleimidobenzoyl N-hydroxysuccinimide,
succinimidyl-(4-vinylsulfonyl)benzoate,
N-succinimidyl-(4-iodoacetyl)aminobenzoate,
sulfo-SIAB,
p-maleimidophenylisocyanate,
N-succinimidyl S-acetylthioacetate,
N-succinimidyl S-acetylthiopropionate,
succinimidyl 3-bromoacetamido)propionate,
succinimidyl iodoacetate, succinimidyl bromoacetate,
succinimidyl 4-(p-maleimidophenyl)butyrate, succinimidyl-p-formyl-benzoate,
pyridine dithioethylamine hydrochloride,
4-(N-maleimido)benzophenone,
4-(N-succinimidylcarboxy)benzophenone,
4-(N-iodoacetyl)benzophenone,
(N-succinimidyl 3-[2-pyridyldithio]propionate),
(3-[2-pyridyldithio]propionyl hydrazide),
succinimidyl 6-[3-(2-pyridyldithio)propionamido]hexanoate,
sulfo-succinimidyl 6-[3-(2-pyridyldithio)propionamido] hexanoate,
succinimidyl-4-[2-(tert-butoxycarbonyl)hydrazino]benzoate,
succinimidyl-4-[2-(tert-butoxycarbonyl)hydrazino]acetate,
2-iminothiolane hydrochloride,
S-acetylmercaptosuccinic anhydride,
6-(N-trifluoroacetyl)caproic acid NHS,
6-(N-t-BOC)caproic acid NHS,
succinimidyl-6-(iodoacetyl)aminocaproate and
methyl N-succinimidyl adipate.

According to another embodiment of the invention the linker could also be a bifunctional molecule that presents opportunity for moderate coupling to the amino functional groups of the polymer, thus rendering it capable of complexing with metals. Such bifunctional molecules include Schiff base ligands. Examples of Schiff base ligands include, but are not limited to:

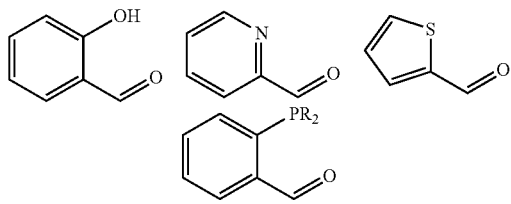

R = Ph, Cy, Me, Bu

Metals (M) which can be supported on the polymer using a Schiff base ligand include Pd, Pt, Ru, Rh Ir, Os, Mn, Ni, Co and Fe in all their possible oxidation states. The resulting complexes have the following general form:

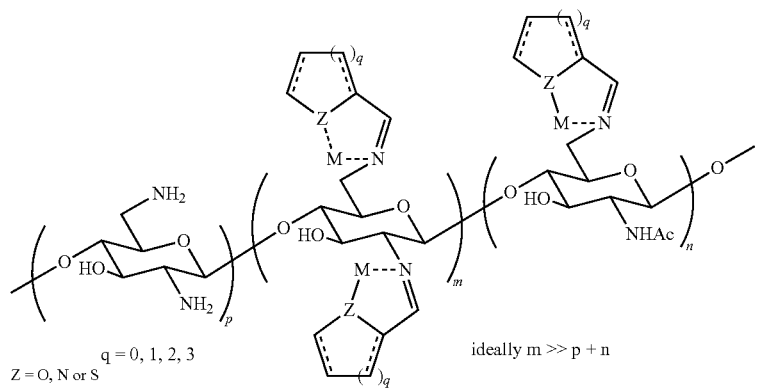

q = 0, 1, 2, 3
Z = O, N or S
ideally m >> p + n

These metal complexes can be termed metal-immobilised 6-deoxy 6-amino chitosan and represent a further aspect of the invention. The invention further provides for the use of such metal-immobilised 6-deoxy 6-amino chitosan compounds as catalysts.

The invention further provides a process for the preparation of a metal-immobilised 6-amino 6-deoxy chitosan which includes preparing a 6-deoxy 6-amino chitosan Schiff base by exhaustive reaction of an aldehyde containing ligand, followed by reaction with a metal precursor in a suitable solvent and mixing until the reaction is complete. A Schiff-base reaction is one between an aldehyde and an amine, where the aldehyde is part of the linker molecule and the amine groups refers to the 6-amino and 2-amino groups of the 6-deoxy 6-amino chitosan.

6-Deoxy 6-amino chitosan-Schiff base ligands, or polymer supports, were prepared by adding 6-deoxy 6-amino chitosan to a suitable aldehyde and refluxing the mixture in methanol and acetic acid. After completion of the reaction, the 6-deoxy 6-amino chitosan-Schiff base ligands were collected by filtration and washed thoroughly with distilled water, ethanol then acetone respectively. The product was then dried under vacuum at 60° C. for 8 h. The following examples illustrate this process:

Preparation of 6-deoxy 6-amino chitosan-2-pyridylimine [PS1]

6-deoxy 6-amino chitosan (400 mg) and 2-pyridine carboxaldehyde (1.20 ml, 12.53 mmol) were refluxed in methanol (30 ml) and acetic acid (3 ml) for 10 h. The product was obtained as a brown solid. Yield, (241 mg, 60%). FT-IR (KBr): 3434 v(OH), 2919 v(C—H), 1648 v(C=N), 1591 v(pyridyl C=N), 1569 v(aromatic C=C), 1154-1069 v(pyranose), 777 cm$^{-1}$ v(aromatic C—H). Elemental analysis. Found: C, 50.08; H, 5.89; N, 9.10.

Preparation of 6-deoxy 6-amino chitosan-2(diphenylphosphino) imine [PS2]

6-deoxy 6-amino chitosan (500 mg) and 2-(diphenylphosphino) benzaldehyde (142 mg, 0.490 mmol) were refluxed in methanol (30 ml) and acetic acid (3 ml) for 10 h. The product was obtained as an orange solid. Yield, (324 mg, 65%). FT-IR (KBr): 3436 v(OH), 2913 v(C—H), 1639 v(C=N), 1154-1023 v(pyranose), 697 v(aromatic C=C), 1154-1069 v(pyranose), 777 cm$^{-1}$ v(aromatic C—H). Elemental analysis. Found: C, 45.66; H, 6.22; N, 7.28.

Preparation of 6-deoxy 6-amino chitosan-salicylaldimine [PS3]

6-deoxy 6-amino chitosan (200 mg) and salicylaldehyde (0.60 ml, 5.64 mmol) were refluxed in methanol (30 ml) and acetic acid (3 ml) for 10 h. The product was obtained as a dark orange solid. Yield, (120 mg, 60%). FT-IR (KBr): 3420 v(OH), 2884 v(C—H), 1631 v(C=N), 1577 v(C=C), 1278 v(phenolic C—O), 1150-1020 v(pyranose), 754 cm$^{-1}$ v(aromatic C—H). Elemental analysis. Found: C, 55.86; H, 5.87; N, 5.88.

Metal-immobilized 6-deoxy 6-amino chitosan compounds, in this embodiment catalysts, were produced from the 6-deoxy 6-amino chitosan-Schiff base ligands by mixing these polymer supports with a metal precursor in acetone at room temperature over 48 h. After the reaction the supported Schiff base catalysts were collected by filtration, washed with distilled water, ethanol then acetone (50 ml each) respectively then dried under vacuum at 60° C. for 8 h. The following examples are illustrative of the process.

Preparation of 6-deoxy 6-amino chitosan-2-pyridylimine-Pd catalyst [Pd1]

6-deoxy-6-amino chitosan-Schiff base 6-deoxy 6-amino chitosan-2-pyridylimine (200 mg, 0.02 mmol) and [PdCl$_2$(COD)] (17 mg, 0.06 mmol) were mixed in acetone. The product was obtained as a dark yellow solid. Yield, (218 mg, 91%). FT-IR (KBr): 3419 v(OH), 2918 v(C—H), 1639 v(C=N), 1595 v(pyridyl C=N), 1566 v(aromatic C=C), 1152-1066 v(pyranose), 775 cm$^{-1}$ v(aromatic C—H). Elemental analysis. Found: C, 44.08; H, 5.70; N, 7.42. ICP-MS (Pd): 0.121 mmolg$^{-1}$.

Preparation of 6-deoxy 6-amino chitosan-2(diphenylphosphino) imine-Pd catalyst [Pd2]

Preparation of 6-deoxy 6-amino chitosan-2(diphenylphosphino) imine-Pd catalyst [Pd2]

6-deoxy-6-amino chitosan-Schiff base 6-deoxy 6-amino chitosan-2(diphenylphosphino) imine (350 mg, 0.035 mmol) and [PdCl$_2$(COD)] (15 mg, 0.052 mmol) were mixed in acetone. The product was obtained as a dark orange solid. Yield, (100 mg, 67%). FT-IR (KBr): 3428 v(OH), 2920 v(C—H), 1638 v(C=N), 1576 v(aromatic C=C), 1152-1021 v(pyranose), 667 cm$^{-1}$ v(aromatic C—H). Elemental analysis. Found: C, 42.08; H, 6.50; N, 4.12. ICP-MS (Pd): 0.123 mmolg$^{-1}$.

These processes can be schematically represented as follows:

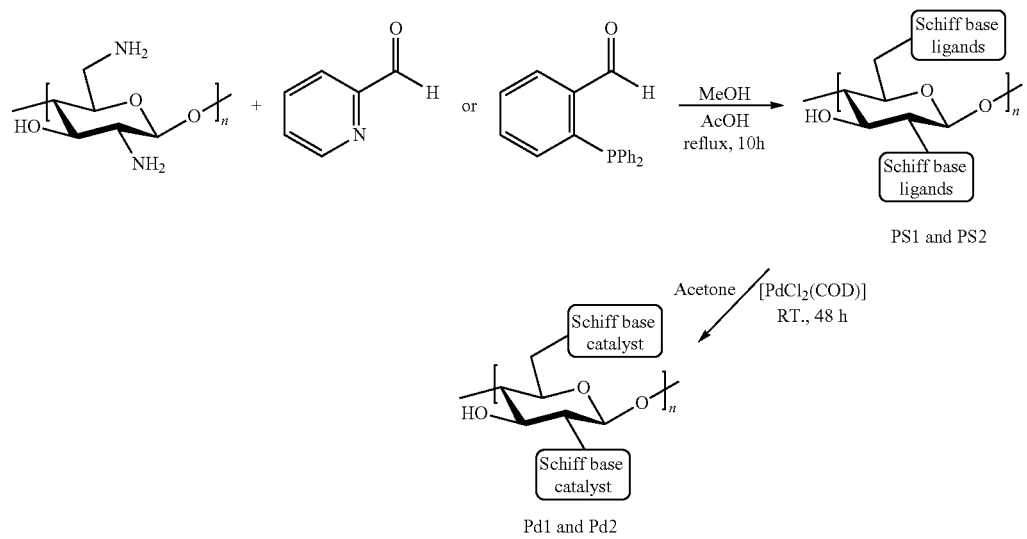

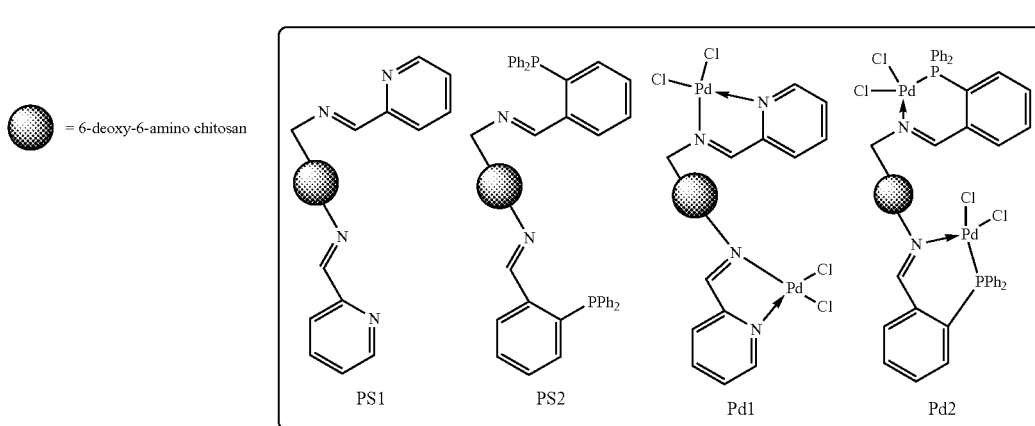

The loading of linker or ligand sites on the catalysts was determined using UV, by measuring the absorbance of increasing amounts ($0.5-11.0\times10^{-6}$ M, in methanol) of the aldehydes. (2-pyridinecarboxaldehyde) and 2(diphenylphosphino) benzaldehyde gave linear (R=0.995) calibration curves. Thus, the absorbances of the supported imines, once cleaved with dilute HCl were measured and used to determine the imine loading as shown in Table 1.

The degree of substitution (DS) was calculated from the elemental analyses results using the equation $DS=\Delta_{C/N}/\{M_{C/N}(1-DA)\}$, where $\Delta_{C/N}$ is the C/N percentage ratio differences of these elements in the derivatives and in the original starting material (chitosan or 6-deoxy-6-amino chitosan), $M_{C/N}$ is the ratio of C to N molar mass and DA is the degree of acetylation of the starting material. This equation slightly overestimates the values obtained by UV analysis, potentially due to the residual water molecules in the biopolymer.

TABLE 1

Microanalyses, yields and degree of substitution (DS) of chitosan-Schiff base ligands.

| Biopolymer/chitosan-ligand | Elemental analysis EA (%) | | | | Loading (DS) (mmolg$^{-1}$) | | Yield (%) |
| --- | --- | --- | --- | --- | --- | --- | --- |
| | C | H | N | C/N | EA | UV[a] | |
| Chitosan | 40.92 | 6.89 | 7.85 | 5.21 | 2.10[b] | — | — |
| 6-deoxy-6-amino chitosan | 44.35 | 7.04 | 8.14 | 5.45 | 2.99[c] | — | — |
| PS1 | 50.08 | 5.89 | 9.10 | 5.50 | 0.20 | 0.18 | 60 |
| PS2 | 45.66 | 6.22 | 7.28 | 6.27 | 0.18 | 0.14 | 65 |

[a]Absorbance is dependent on conc., solvent and pH.
[b]Free NH$_2$ determined using literature.
[c]loading of NH$_2$ in 6-deoxy-6-amino chitosan previously determined by a fluorescamine assay].

The metal loading was determined using ICP-MS, and the results showed Pd loadings of 0.121 (Pd1) and 0.123 mmolg$^{-1}$ (Pd2) as shown in Table 2. Thus for the supported Pd catalysts approximately 60% (Pd1) and 62% (Pd2) of the ligands are occupied by metal. Generally, the Pd loading levels on the supported catalysts are comparable to similar catalysts in literature.

TABLE 2

Microanalyses, yields and Pd content of chitosan-Schiff base catalysts.

| Catalyst | Metal | Elemental analysis EA (%) | | | | Pd loading (mmolg$^{-1}$) ICP value | Yield (%) |
| --- | --- | --- | --- | --- | --- | --- | --- |
| | | C | H | N | C/N | | |
| Pd1 | Pd | 44.08 | 5.70 | 7.42 | 5.94 | 0.121 | 91 |
| Pd2 | Pd | 42.08 | 6.50 | 4.12 | 10.21 | 0.123 | 67 |

The catalysts Pd1 and Pd2 formed nano-sized Pd particles of average size 80-120 nm. The existence of Pd particles visible through TEM imaging may imply intermolecular interactions between angstrom size molecular Pd" sites on the biopolymer resulting in nanosized particles.

A chitosan-supported Pd$^0$ catalyst was prepared following a prior art protocol and subsequently analysed by X-ray diffraction. Crystalline Pd$^0$ was present in the reduced catalyst as shown from the characteristic Pd$^0$ peaks (2θ=40°, 45°, 68° and) 80° in its diffractogram. No Pd peaks were observed in the diffractograms of the catalysts (Pd1 and Pd2), implying that Pd exists in an amorphous state on the polymer support.

The catalysts Pd1 and Pd2 were analysed thermally by thermal gravimetric analysis (TGA) in air. This showed that the catalysts are stable up to 240° C., following which a significant weight loss due to degradation of the biopolymer was observed. Thus the catalysts would be capable of withstanding high reaction temperatures up to slightly below 240° C. A 3.5-5.0% weight loss of the catalysts before the degradation was noted and is attributed to the desorption of water.

The activities of the catalysts Pd1 and Pd2 were examined in the Suzuki-Miyaura reaction of aryl halides with phenylboronic acid which proceeds according to the following reaction scheme:

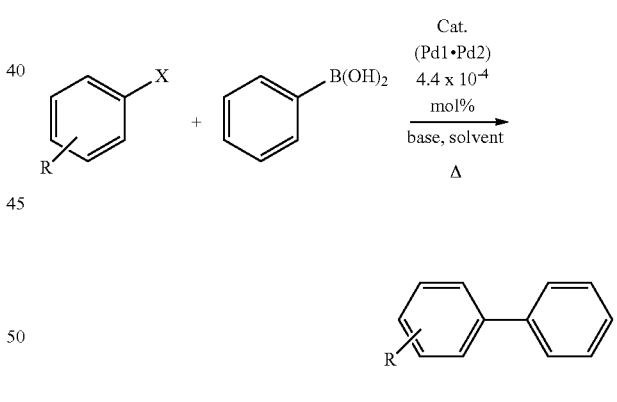

R = H, 4-Bu$^n$, 4-Ac, 4-OMe or 4-NO$_2$
X = Cl, Br or I

Under conditions similar to those reported in literature (143° C.), catalyst Pd1 gave a yield of 85%. On varying the reaction temperature (143° C., 130° C. and 95° C.), it was observed that the optimal temperature for Suzuki-Miyaura cross-coupling using catalyst Pd2 was 130° C. Subsequently, all other reactions were performed at this temperature, resulting in good catalytic activities ($4.4\times10^{-5}$ mol % Pd used) as evidenced by moderate to high TONs as shown in Table 3. The catalysts' TON values were comparably higher than those reported in the prior art that use more catalyst (by mol %).

TABLE 3

Suzuki-Miyaura cross coupling reactions catalyzed by supported Pd catalysts.

| Entry | Catalyst[a] | R | X | Base | Conversion (%)[b] | TON [(mol$_{Prod.}$)/(mol$_{Pd}$)][c] | Selectivity (%) |
|---|---|---|---|---|---|---|---|
| 1 | Pd2 | H | Br | K$_2$CO$_3$ | 96 | 1116 | >99 |
| 2[e] | Pd1 | H | Br | K$_2$CO$_3$ | 85 | 1144 | 99 |
| 3 | Pd2 | p-Bu$^n$ | Br | K$_2$CO$_3$ | 75 | 879 | 98 |
| 4 | Pd1 | H | Cl | K$_2$CO$_3$ | 1 | 12 | 97 |
| 5 | Pd2 | H | Cl | K$_2$CO$_3$ | 8 | 88 | 97 |
| 6 | Pd1 | H | I | K$_2$CO$_3$ | 29 | 342 | 98 |
| 7 | Pd2 | H | Br | Na$_2$CO$_3$ | 26 | 309 | 99 |
| 8 | Pd1 | H | Br | Na$_2$CO$_3$ | 34 | 405 | 99 |
| 9[f] | Pd1 | p-NO$_2$ | Br | K$_2$CO$_3$ | 87 | 1015 | >99 |

[a]Reactions carried out in xylene (20 ml) over 6 h, with 5.1 mmol of arylhalide, 7.5 mmol of phenylboronic acid, 10 mmol of base and 4.47 × 10$^{-4}$ mmol Pd catalyst (loading = (Pd1) 0.121 and (Pd2) 0.123 mmolg$^{-1}$) at 130° C. unless stated otherwise.
[b]GC conversions obtained using n-decane as an internal standard and are based on the amount of arylhalide employed in relation to authentic standard biphenyl or substituted biphenyl.
[c]Maximum TON from reaction at 4 hrs. [
[e]Reaction carried out at 143° C.
[f]Reaction carried out in EtOH:H$_2$O (1:1, 20 ml).

The catalysts Pd1 and Pd2 were recovered by simple filtration and washed with water, ethanol then acetone and oven dried. The catalysts could be reused at least five times without significant loss of activity. Loss of activity was noted in the 6$^{th}$ run and may have been be due to poisoning or fouling of the catalysts by waste inorganics and unreacted reagents blocking the active Pd sites.

A hot filtration test, whereby the catalyst was filtered off 5 minutes after the reaction started followed by the filtrate being taken back to the reaction temperature stopped the catalytic reaction. This effectively proves the heterogeneous nature of the supported catalyst and without a measurable homogeneous contribution. Furthermore, no Pd was detected by ICP-MS analysis in this mixture. Coordination of Pd to the 6-deoxy 6-amino chitosan supported Schiff-base ligands shows no evidence of Pd leaching into the products. This provides evidence of 6-deoxy 6-amino chitosan acting as a good scaffold for Pd$^{II}$ catalyst precursors.

Heck cross-coupling reactions were also investigated under similar temperature conditions as utilised for the Suzuki-Miyaura reactions. These reactions occur according to the following general scheme:

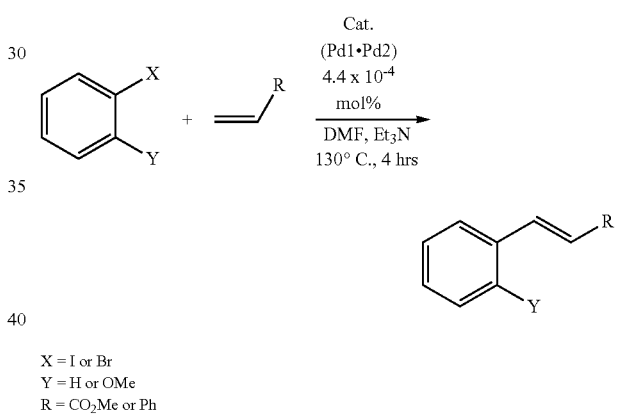

X = I or Br
Y = H or OMe
R = CO$_2$Me or Ph

The reactions using catalyst Pd1 with iodobenzene and methyl acrylate produced 99% trans-methylcinnamate in 4 hrs at 130° C. as shown in Table 4.

TABLE 4

Heck cross coupling reactions catalyzed by supported Pd catalysts

| Entry | Catalyst[a] | X | Y | R | Conversion (%)[b] | TON [(mol$_{Product}$)/(mol$_{Pd}$)] | Selectivity (%) |
|---|---|---|---|---|---|---|---|
| 1 | Pd1 | I | H | CO$_2$Me | 99 | 1209 | >99 |
| 2 | Pd2 | I | H | Ph | 90 | 1086 | >99 |
| 3 | Pd2 | I | OMe | Ph | 20 | 237 | >99 |
| 4 | Pd1 | I | OMe | CO$_2$Me | 62 | 757 | >99 |

[a] Reactions carried out in DMF (20 ml) over 4 h, with 5.3 mmol of iodobenzene, 5.3 mmol of methyl acrylate or styrene, 10 mmol of triethylamine and 4.47 × 10$^{-4}$ mmol Pd catalyst (loading = 0.044 (5); 0.054 (6); (7) 0.121 and (8) 0.123 mmolg$^{-1}$) at 130° C. unless stated otherwise.
[b] GC conversions obtained using n-decane as an internal standard and is based on the amount of iodobenzene employed in relation to authentic standard trans-methyl cinnamate or trans-stilbene.

Coupling of styrene and iodobenzene was also accomplished, giving 90% of trans-stilbene respectively with a good TON of 1086 using catalyst Pd2. Thus, the aforementioned catalytic reactions lead to regiospecific formation of the trans isomers products, this was confirmed by GC analysis and NMR spectroscopy. With 2-iodobenzene, poor yields of the coupling products were obtained. However, the catalysts Pd1 and Pd2 gave better yields of the coupled product when compared to a commercial polystyrene-supported catalyst for unsubstituted iodobenzene under similar reaction conditions.

The supported-Pd catalysts of the invention exhibited high activity towards the Suzuki-Miyaura and Heck cross-coupling reactions in xylene and aqueous ethanol solvents, with no Pd detected in the reaction products. The supported catalysts displayed good activity at low Pd loading ($4.4 \times 10^{-4}$ mol %) and in aqueous media. The catalysts could be easily separated and recovered from the reaction mixture (by filtration) and reused several times. The advantages displayed by the catalysts include ease of preparation, high catalytic activity, stability, reusability, versatility (organic or aqueous solvent catalysis) and no measurable Pd leaching. These catalysts are thus viable alternatives in cross-coupling reactions based on efficiency, environmental stewardship and economical grounds.

It will be appreciated that many other catalysts, including other metal-immobilized 6-deoxy-6-amino chitosan compounds, and process for preparing such catalysts exist which fall within the scope of the invention.

Further according to the invention there is provided an improved process for producing 6-deoxy 6-amino chitosan. This process includes converting the 6-hydroxy group of N-phthaloyl-chitosan to obtain the 6-p-toluenesulfonate ester, substituting the 6-p-toluenesulfonate ester with azide to obtain the 6-azido polymer, and reducing the 6-azido polymer to yield 6-deoxy 6-amino chitosan. One embodiment of the process as is performed as follows:

Phthaloyl Chitosan

Phthalic anhydride (18.0509 g) was dissolved in dimethylformamide (DMF) containing 5% (v/v) water (120 mL). The resulting solution was poured into a flask containing low molecular weight chitosan (6.0159 g). The mixture was heated to 120° C. under reflux for 8 h. After completion of the reaction the resulting pale-light brown solution was poured into 200 mL ice water and the resulting precipitate filtered under suction. The filtered precipitate was washed with methanol (300 mL), with the filtrate checked for unreacted phthalic anhydride by TLC under UV, until there was none present. The product was dried under suction and finally under vacuum to a constant mass, resulting in 8.0157 g of a pale tan powder.

IR (KBr): ν 3435.13 (OH), 2922.12 (CH2), 1778.37 (imide C=O), 1707.34 (imide C=O), 1197.52-1067.62 (pyranose), and 720.49 $cm^{-1}$ (phthaloyl-aromatic).

6-Deoxy 6-p-toluoyl N-phthaloyl chitosan

N-phthaloyl-chitosan (3.0004 g) was dissolved in pyridine (60 mL) and then cooled in an ice bath. To this cooled solution, p-toluoylsulfonyl chloride (20.5391 g) was added and the mixture was allowed to stir for 17 h at room temperature. The resulting viscous solution was added in of ice water (400 mL) and a precipitate obtained. The precipitate was filtered and washed with ethanol and ether, dried under vacuum to constant mass to obtain 5.1206 g of a light brown powder.

IR (KBr): ν 1777.79 (imide C=O), 1717.21 (imide C=O), 1388.54 and 1177.31 (S=O), 816.47 and 669.98 $cm^{-1}$ (p-phenyl)

6-Deoxy 6-azido N-phthaloyl chitosan

6-O-tosyl phthaloyl-chitosan (4.5038 g) was added to NMP (350 mL) and sodium-azide ($NaN_3$) (8.4376 g) added to that solution. The resulting mixture was then stirred at 80° C. for 4 h under nitrogen. Excess NMP was removed from the resulting mixture after cooling, and the solution poured into ethanol (100 mL) to form the precipitate. The resulting mixture was then left overnight for the precipitate to settle, and the top layer of the solution removed. Ethanol-water 40% (v/v) (100 mL) was added to the resulting solution and the centrifuged (10000 rpm for 7 mins at 10° C.). The supernatant was then discarded, precipitate washed with acetone, and collected and dried under suction. The resulting brown powder was then dried under vacuum to constant mass, resulting in 2.1000 g.

IR (KBr): ν 2100 (azido), 1779.70 (imide C=O), 1713.04, 1178.01-1060.64 (pyranose) and 721.13 (phthaloyl-aromatic) $cm^{-1}$.

6-Deoxy 6-amino chitosan

To a solution of 6-deoxy 6-azido-phthaloyl-chitosan (20 g) NMP (160 mL), TPP (33 g) was added and the reaction was allowed to stir for 15 h under nitrogen at room temperature. This was followed by treatment with hydrazine monohydrate (20 mL) and water (140 mL) and stirring continued under nitrogen at 100° C. for an additional 4 h. Excess water in the reaction mixture was evaporated and the remaining mixture added to ethanol (300 mL). The resulting precipitate was collected by centrifugation (100000 rpm, 7 min, 3 times) and washed with ethanol and collected by suction filtration. The resulting precipitate dissolved in deionised water and purified by ultra filtration using a dialysis bag with a cut off molecular weight of 10 kDa. The product was obtained and lyophilized to obtain 22 g of a white material.

IR (KBr): ν 1654 and 1590 ($NH_2$), 1054.33 $cm^{-1}$ (pyranose); $^1H$ NMR (300 MHz, $D_2O$) δ 8.15 (m, Ar—H), 4.59 (m, 1H, β-H1), 3.72 (m, 4H, H-3, H4, H5, H6), and 3.2 (m, 1H, H-2)

The process offers the advantage over prior art process in that it is simple to scale up and produces product of high quality. It will be apparent to those skilled in the art, however, that other processes for producing 6-deoxy 6-amino chitosan exist which falls within the scope of the invention.

As illustrated above, 6-deoxy 6-amino chitosan is able to act as a polymer support and its use as a polymer support also forms part of the present invention. While metal-immobilized 6-deoxy 6-amino chitosan catalysts have been described, it will be apparent that many other uses falling within the scope of the invention exist for 6-deoxy 6-amino chitosan as a polymer support.

6-deoxy 6-amino chitosan has a number of advantages as a polymer support. The conversion of the natural 6-hydroxy group of the polymer units to a 6-amino group, allows doubling of the catalyst loading as it has almost twice as many reactive amino groups compared to native chitosan. This higher loading/unit mass is expected to yield higher activity and turnover numbers.

Also, existing natural metal-immobilised polymers have limited swelling capacity or solubility. Unlike chitosan which is a sparingly soluble polymer, 6-deoxy 6-amino chitosan is almost completely soluble in aqueous media. This broadens the application of green technologies that replace or minimize the use of organic solvents.

6-deoxy 6-amino chitosan also has improved solubility and activity in a wider range of solvents than chitosan, thus offering a much broader range of potential applications as a polymer support.

6-deoxy 6-amino chitosan is renewable, biodegradable, has double the catalyst loading and may tolerate (show appreciable activity) in a wider range of solvents, including water, than existing chitosan or synthetic polymer supports. The 6-deoxy 6-amino chitosan polymer can also be selectively functionalized to perform stereoselective reactions. More specifically, the 6-deoxy 6-amino chitosan polymer can enable organic synthesis involving carbon-carbon bond forming reactions, such as the Heck, Suzuki reactions and variations thereof, and stereoselective hydrogenation and carbon-carbon bond formation is likely to occur since the catalyst is embedded in a chiral environment.

Furthermore, it is desirable for those in the art of modifying polymers for the purpose of utilising these as target delivery vehicles to be able to selectively couple a target recognition epitope on one part of the polymer and the active on the other. The method of synthesis of 6-deoxy 6-amino chitosan allows for the preparation of intermediates that are orthogonally protected. For example, 6-deoxy 6-azido chitosan is such an intermediate that can be functionalized on the C-2 amino group using standard amino group chemistry. Simultaneously, the C-6 azido functionality can be exploited with "click" chemistry. For those skilled in the art, click chemistry is the process of reacting alkynes with azides to give triazole adducts. In this process functional molecules and linkers can be covalently attached to the polymer support. Also within the reach of this process is the preparation of C-6 deoxy 6-amino 2-phthaloyl chitosan, useful as an orthogonally protected compound. Whereby standard amino group chemistry can be utilised at the C-6 position, while subsequent deprotection of the 2-phthaloyl group would free the C-2 amino group for conjugation of a second functional molecule of interest.

It will also be appreciated that the polymer support of the invention could, for example, be provided with a linker or chelate which is selective to specific metal or metals and this could be used to scavenge or recover the metal or metals from a solution. In this instance the terminal molecule does not serve as a reagent or catalyst but can be modulated for its affinity to the said metal(s) by means of a pH adjustment and hence, the metal(s) can be removed from the polymer support. The characteristics of 6-deoxy 6-amino chitosan which have been noted above in respect of the catalysts are also relevant here, including it high loading capacity and solubility in a range of solvents.

The polymer support of the invention can also provide metal-chelating polymers useful in preparation of polymer compositions for selective binding to bioactive agents. In such instance, metal affinity epitopes, that include specific amino acid sequences, can be loaded onto the polymer compositions and held in a non-covalent complex until selective release. Such polymer compositions should have immobilised EDTA or EGTA or similar molecules onto which nickel or cobalt chelates. In turn, the resulting ion exchange column would have high affinity for proteins rich in a sequence of repeating histidine amino acids. As an example, for those familiar with the art of protein purification, it is ideal to engineer a sequence of 6 to 8 histidines into the N- or C-terminal of the protein. The polyhistidine binds strongly to divalent metal ions such as nickel and cobalt. The protein can be passed through a column containing immobilized nickel ions, which binds the polyhistidine tag. All untagged proteins pass through the column. The protein can be eluted with imidazole, which competes with the polyhistidine tag for binding to the column, or by a decrease in pH (typically to 4.5), which decreases the affinity of the tag for the resin.

Many other uses for polymer supports of the invention will be apparent to those skilled in the art.

The invention claimed is:

1. A polymer support characterized in that the polymer is 6-amino 6-deoxy chitosan, wherein a linker is provided on at least some of the amine groups of the polymer and wherein the linker is introduced as a heterobifunctional moiety capable of covalent coupling with the amino functional groups of the polymer on one end and a functional molecule on the other end and wherein the heterobifunctional moiety is selected from the group consisting of succinimidyl acetylthioacetate, succinimidyl trans-4-(maleimidylmethyl) cyclohexane-1-carboxylate, succinimidyl 3-(2-pyridyldithio)propionate, 1-ethyl-3-(3-dimethylaminopropyl)carbodiimide, N-((2-pyridyldithio)ethyl)-4-azidosalicylamide, 4-azido-2, 3,5,6-tetrafluorobenzoic acid, succinimidyl ester, benzophenone-4-maleimide, benzophenone-4-isothiocyanate, 4-benzoylbenzoic acid, succinimidyl ester, iodoacetamide azide, iodoacetamide alkyne, azido $(PEO)_4$ propionic acid, succinimidyl ester, alkyne, succinimidyl ester, alpha-maleimidoacetic acid-NHS, 2-maleimidoethyl amine.TFA, 3-maleimidopropionic acid NHS, 3-maleimidopropionic acid-PFP ester, 4-maleimidobutyric acid NHS, 6-maleimidocaproic acid NHS, 6-[N-(6-maleimidocaproyl)]caproic acid NHS, 6-maleimidocaproic acid sulfo-NHS, 6-maleimidocaproic acid (2-nitro-4-sulfo) phenyl ester sodium salt, 11-maleimidoundecanoic acid sulfo-NHS, succinimidyl 6-[(3-maleimido)propionamido]-hexanoate, LC-SMPH, b-maleimidopropionic acid hydrazide, e-maleimidocaproic acid hydrazide, 11-maleimidoundecanoic acid hydrazide, 3-maleimidopropionic acid, 4-maleimidobutyric acid, 6-maleimidocaproic acid, 11-maleimidoundecanoic acid, SMCC, sulfo-SMCC, SMCC hydrazide, LC-SMCC, m-maleimidobenzoyl N-hydroxysuccinimide, sulfo-MBS-1, p-maleimidobenzoyl N-hydroxysuccinimide, succinimidyl-(4-vinylsulfonyl)benzoate, N-succinimidyl-(4-iodoacetyl) aminobenzoate, sulfo-SIAB, p-maleimidophenylisocyanate, N-succinimidyl S-acetylthioacetate, N-succinimidyl S-acetylthiopropionate, succinimidyl 3-bromoacetamido) propionate, succinimidyl iodoacetate, succinimidyl bromoacetate, succinimidyl 4-(p-maleimidophenyl)butyrate, succinimidyl-p-formyl-benzoate, pyridine dithioethylamine hydrochloride, 4-(N-maleimido)benzophenone, 4-(N-succinimidylcarboxy)benzophenone, 4-(N-iodoacetyl)benzophenone, (N-succinimidyl 3[2-pyridyldithio]propionate), (3-[2-pyridyldithio]propionyl hydrazide), succinimidyl 6-[3-(2-pyridyldithio)propionamido]hexanoate, sulfo-succinimidyl 6-[3-(2-pyridyldithio)propionamido]hexanoate, succinimidyl-4-[2-(tert-butoxycarbonyl)hydrazino]benzoate, succinimidyl-4-[2-(tert-butoxycarbonyl)hydrazino]acetate, 2-iminothiolane hydrochloride, S-acetylmercaptosuccinic anhydride, 6-(N-trifluoroacetyl)caproic acid NHS, 6-(N-t-BOC)caproic acid NHS, succinimidyl-6-(iodoacetyl)aminocaproate, and methyl N-succinimidyl adipate and combinations thereof.

2. A polymer support which includes 6-amino 6-deoxy chitosan, wherein a linker is provided on at least some of the amine groups of the polymer and wherein the linker is introduced as a heterobifunctional moiety capable of covalent coupling with the amino functional groups of the polymer on one end and a functional molecule on the other end and wherein the bifunctional molecule is capable of complexing a metal after being immobilized on the polymer, and wherein the aldehyde linker includes at least one functional group selected from the group consisting of

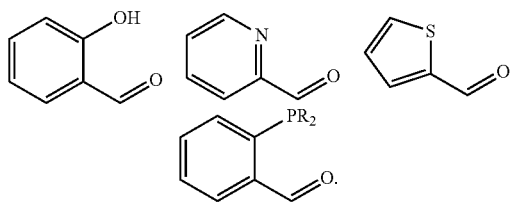

R = Ph, Cy, Me, Bu

3. A compound which includes 6-amino 6-deoxy chitosan and which is characterized in that the 6-amino 6-deoxy chitosan acts as a polymer support to a functional molecule associated therewith, wherein the functional molecule is a metal or metal complex.

4. A compound as claimed in claim 3 wherein the metal is selected from the group consisting of Pd, Pt, Ru, Rh Ir, Os, Mn, Ni, Co and Fe in all their possible oxidation states.

5. A compound as claimed in claim 3 wherein the metal is complexed to the 6-amino 6-deoxy chitosan through a chelate.

6. A catalyst comprising metal-immobilised 6-amino 6-deoxy chitosan.

7. A catalyst as claimed in claim 6 wherein the immobilising metal is selected from the group consisting of Pd, Pt, Ru, Rh Ir, Os, Mn, Ni, Co and Fe in all their possible oxidation states.

8. A catalyst as claimed in claim 6 wherein the immobilising metal is complexed to the 6-amino 6-deoxy chitosan through a chelate.

9. A process for the preparation of a metal-immobilised 6-amino 6-deoxy chitosan which includes preparing a 6-amino 6-deoxy chitosan Schiff base by exhaustive reaction of an aldehyde containing ligand, followed by reaction with a metal precursor in a suitable solvent and mixing until the reaction is complete.

10. A process as claimed in claim 9 wherein the solvent is a polar solvent, whether protic or aprotic.

11. A process as claimed in claim 9 wherein the 6-amino 6-deoxy chitosan Schiff base ligand is prepared by adding 6-amino 6-deoxy chitosan to a suitable aldehyde and appropriate solvent until the reaction is complete.

12. The compound as claimed in claim 3 wherein the metal is complexed to the 6-amino 6-deoxy chitosan through a Schiff base ligand.

13. A catalyst as claimed in claim 6 wherein the immobilising metal is complexed to the 6-amino 6-deoxy chitosan through a Schiff base ligand.

* * * * *